United States Patent [19]

Belgiorno

[11] 3,830,015

[45] Aug. 20, 1974

[54] ROOT SEPARATING MEANS FOR PLANT CONTAINER

[76] Inventor: Carlo Belgiorno, 1165 Connetquot Ave., Central Islip, N.Y. 11722

[22] Filed: Mar. 10, 1972

[21] Appl. No.: 233,496

[52] U.S. Cl. .................................. 47/37, 47/34.11
[51] Int. Cl. .............................................. A01c 11/00
[58] Field of Search ............... 47/32, 34, 34.1, 34.3, 47/34.11, 37, 44

[56] References Cited
UNITED STATES PATENTS

| | | | |
|---|---|---|---|
| 195,580 | 9/1877 | Crater | 47/34.1 |
| 296,028 | 4/1884 | Martin | 47/34.1 |
| 758,678 | 5/1904 | Muller | 47/34.1 |
| 1,775,831 | 9/1930 | Salisbury | 47/34.1 |
| 1,884,204 | 10/1932 | Pilkington | 47/34.3 |
| 1,971,075 | 8/1934 | Lockwood | 47/34 |
| 2,404,370 | 7/1946 | Fowlices | 47/34.1 |
| 3,775,904 | 12/1973 | Peters | 47/38.1 |

Primary Examiner—Robert E. Pulfrey
Assistant Examiner—R. T. Rader
Attorney, Agent, or Firm—Edward H. Loveman

[57] ABSTRACT

A device for promoting plant growth, comprises a root separator adapted for disposition inside a plant container having a peripheral wall. The root separator has outwardly extending walls terminating at the peripheral wall of the container and defining therewith a plurality of compartments into which the root system of the plant can grow to form a plurality of root clusters which can be spread apart radially after the plant is removed from the container for transplanting.

7 Claims, 30 Drawing Figures

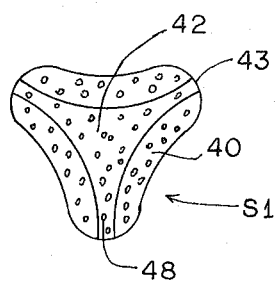
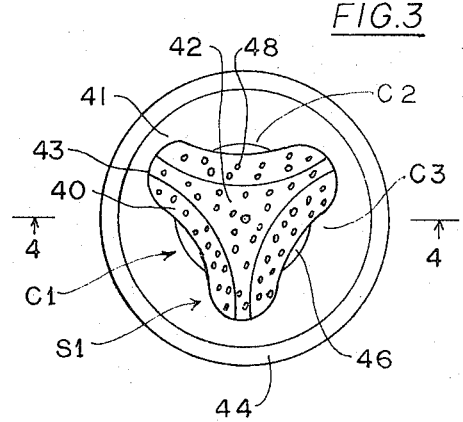
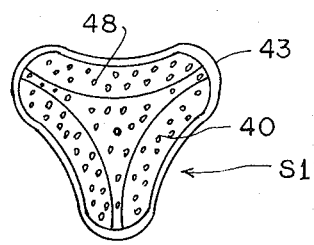
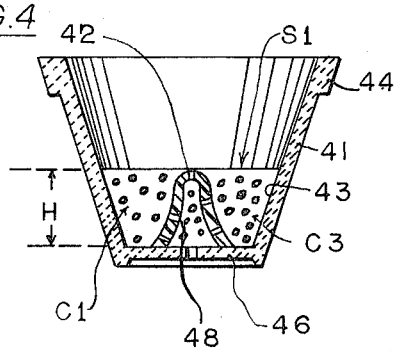
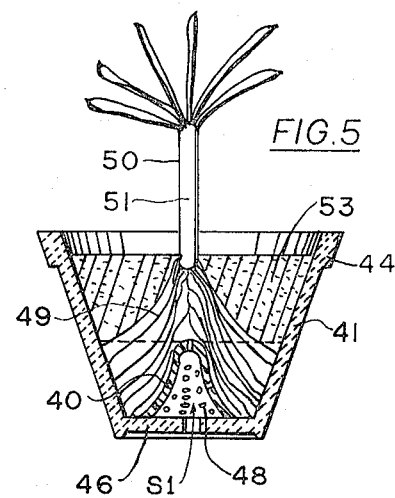
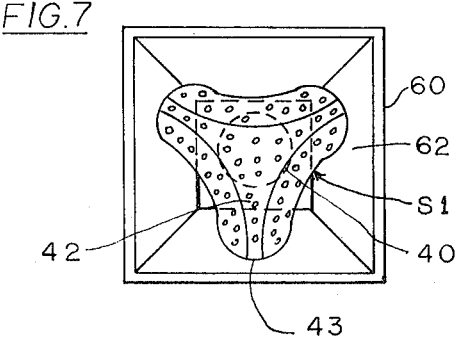
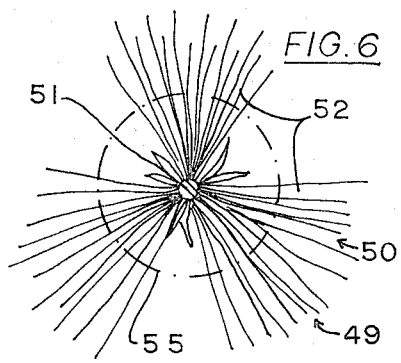

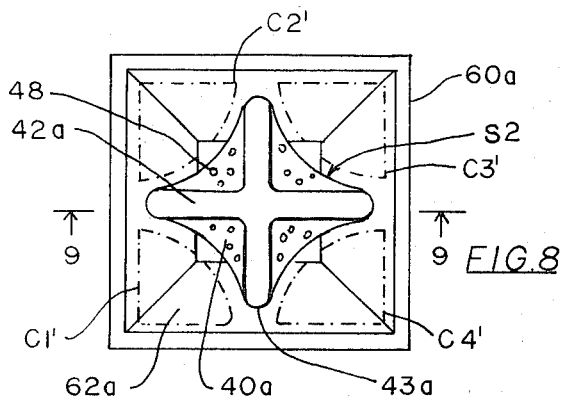
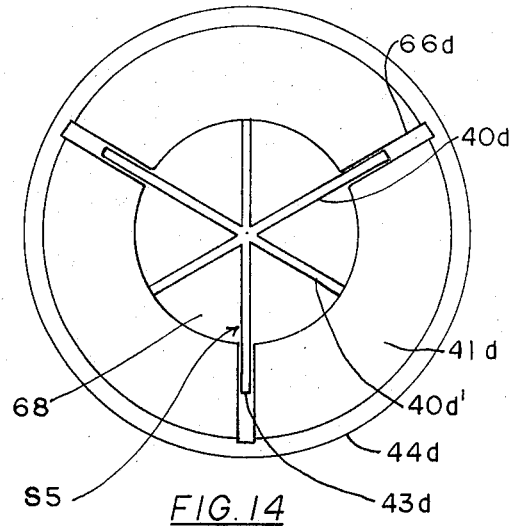
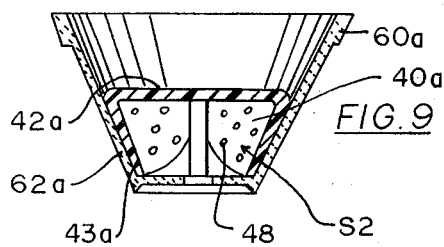
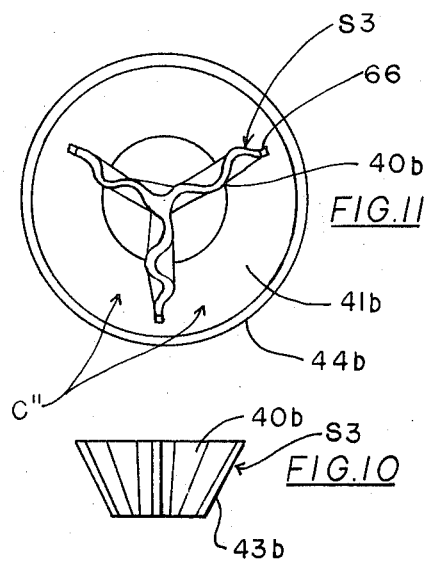
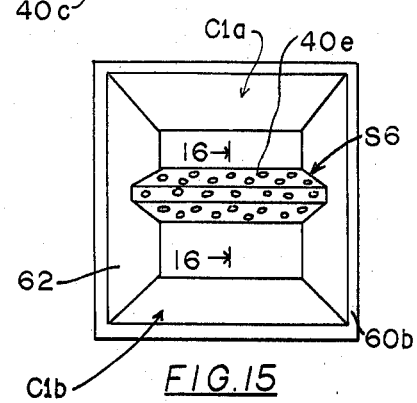
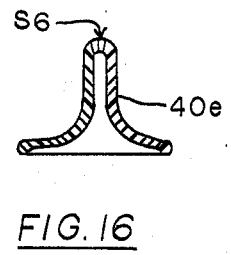
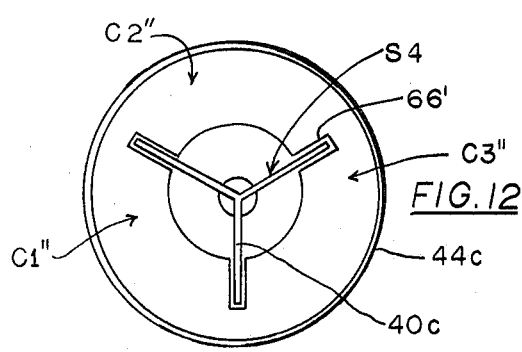

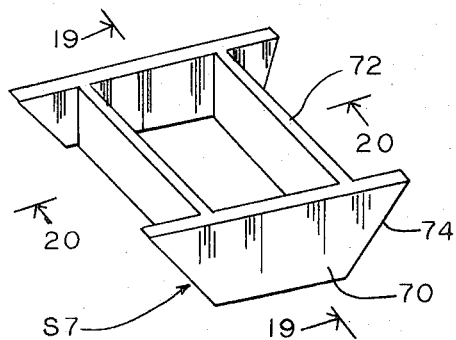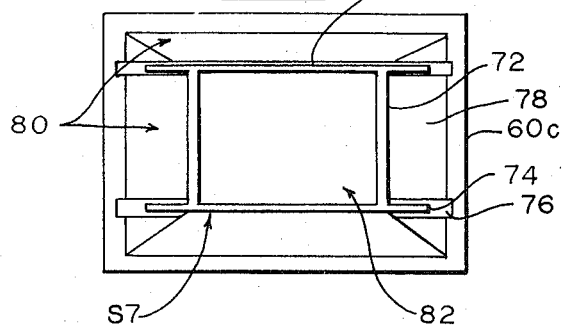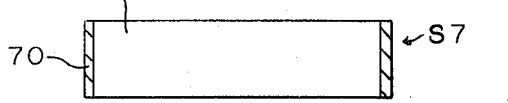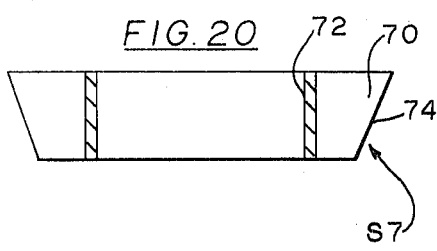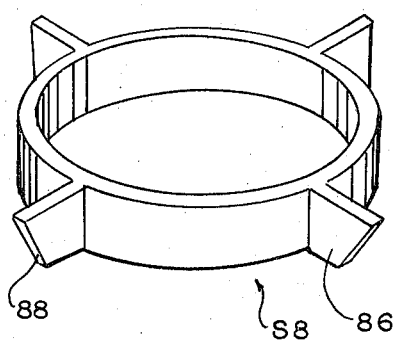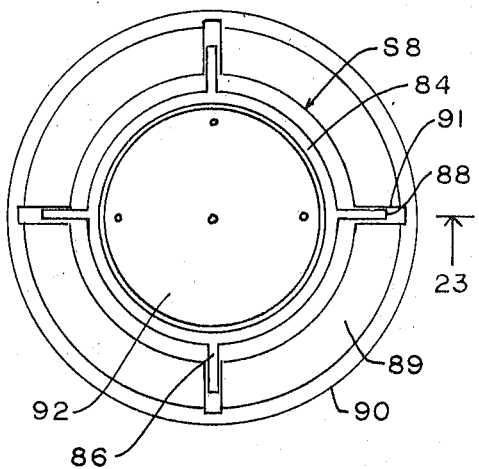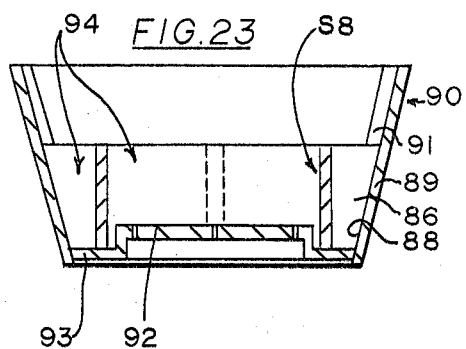

ROOT SEPARATING MEANS FOR PLANT CONTAINER

This invention relates to the art of plant containers, and more particular concerns a plant container having means for dividing the roots of a plant into clumps or clusters while growing in a plant container.

Heretofore container grown plants have developed root balls conforming to the shapes of the containers in which they have been grown. When transplanted into soil, the roots are reluctant to grow out of the soil root ball into the surrounding soil. Water in the soil does not pass readily into the root ball so that the roots dry up and the plant languishes, droops and often dies after transplanting. Root girdling also occurs frequently resulting in loss of the plant.

The present invention is directed at overcoming this situation. There is provided, according to the invention, a container having a partition structure dividing it into a plurality of sections or compartments such that the roots of the plant grown in the container will grow into these compartments. At transplanting time, the plant can be removed from the container and the clusters or clumps of roots can be spread outwardly radially. When planted in the soil in this position, the root surface exposed to soil moisture is doubled or tripled as compared with a plant having a compact root ball. The outward extension of the lower separated root areas helps reduce potential root girdling. Also the plant has a wider base for greater stability in the soil. The effect known as "interface," i.e., the tendency of water refusing to pass between two surfaces of different density or porosity is minimized by the present invention and the water can easily penetrate to the roots, to prevent drying out of the newly transplanted plant. The vertical movement of water to the roots allows fertilizer suspended in the water to pass to these root areas to keep the plant growing and healthy. The invention may be embodied in a molded divider or separator which can be inserted into a standard plant pot or box of round, square, rectangular, hexagonal or other configuration. The separator may be integrally formed with the pot or box or can be a separate removable insert. The separator can divide the interior of the plant container into two, three, four or more sections or compartments of equal or unequal size. The separator insert can be made of any suitable modable material such as clay, plastic, glass, etc. It can be made of machinable material such as wood or metal. Plant containers with integral separators can be made of any suitable man-made or natural material in which plants can be grown. The separators in the containers extend upwardly from the bottoms of the interiors of the containers. The height of the separator walls may be generally about one-third the height of the container but it may be as low as one-quarter or as much as one-half the height of the container.

It is therefore a principal object of the present invention to provide a root separator or divider for a plant container from which the plant can be transplanted to soil or earth with roots spread out in sections.

A further object of the present invention is to provide a root separator or divider which is a separate insert or which is integrally formed with the container walls.

Another object of the present invention is to provide a removable root separator adapted for insertion into plant containers of various shapes and sizes.

Yet another object of the present invention is to provide a hollow wall root separator which will permit drainage and aeration of the inner portion of the root system and thereby enhance growth of the plant.

Still another object of the present invention is to provide a root separator or divider which will divide the growing root system of a plant into a plurality of clumps or cluster which can be spread out after the plant is removed from a container in which it is grown.

These and other objects and many of the attendant advantages of this invention will be readily appreciated as the same becomes better understood by reference to the following detailed description when considered in connection with the accompanying drawings in which:

FIG. 1 is a top plan view of a first plant root separator according to the invention;

FIG. 2 is s bottom plan view of the root separator of FIG. 1;

FIG. 3 is a top plan view of a conical pot with the root separator of FIG. 1 shown therein;

FIG. 4 is a vertical section taken along line 4—4 of FIG. 3;

FIG. 5 is a view similar to FIG. 4, showing a plant with separated roots in the pot;

FIG. 6 is a horizontal sectional view through the stem of the plant after removal from the pot for transplanting, showing three separated and spread out clumps of roots;

FIG. 7 is a top plan view of the separator of FIG. 1 shown in a rectangular pyramidal pot;

FIG. 8 is a top plan view similar to FIG. 7, showing a second root separator in a rectangular pyramidal pot;

FIG. 9 is a vertical sectional view taken along line 9-9 of FIG. 8;

FIG. 10 is a side elevational view of a third root separator;

FIG. 11 is a top plan view of the separator of FIG. 10 shown in a round conical pot;

FIG. 12 is a top plan view similar to FIG. 11 a fourth root separator in a round pot;

FIG. 13 is a side elevational view of the fourth root separator per se;

FIG. 14 is a top plan view showing a fifth root separator in a pot;

FIG. 15 is a top plan view showing a sixth root separator in a rectangular pyramidal pot;

FIG. 16 is a cross sectional view on an enlarged scale taken along line 16—16 of FIG. 15;

FIG. 17 is a top plan view of a seventh root separator in a rectangular box;

FIG. 18 is a perspective view of the seventh root separator per se;

FIG. 19 is a longitudinal sectional view taken along line 19—19 of FIG. 18;

FIG. 20 is a transverse sectional view taken along line 20—20 of FIG. 18;

FIG. 21 is a perspective view of an eighth root separator;

FIG. 22 is a top plan view of the eighth root separator in a large round pot;

FIG. 23 is a vertical cross sectional view taken along line 23—23 of FIG. 22;

Figure 24:
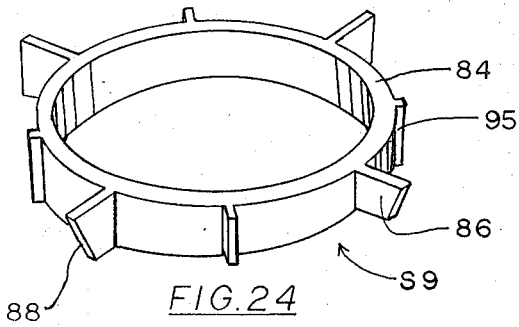
FIG. 24 is a perspective view similar to FIG. 21 of a ninth root separator.

Referring, now the drawings wherein like reference characters designate like or corresponding parts throughout, there is illustrated in FIGS. 1 – 5, a first plant root separator or divider generally designated as reference S1 which is hollow shell-like member generally Y-shaped in plan view. It has three concave walls 40 radiating outwardly from a top Y-shaped wall portion 42. The walls 40 slant downwardly and radially outwardly to define three compartments C1, C2 and C3 with a surrounding wall 41 of a conical pot 44, when the capacitor is inserted into the pot 44. The outer end 43 of the separator walls 40 slant radially inwardly as shown in FIG. 4 to conform with the slanted walls of the pot 44 which may be made of clay, wood or other suitable material for growing a plant. The height H of the separator S1 is preferably about one-third of the distance up from the bottom 46 of the pot 44, but it can be as little as one-quarter or as much as one-half the interior height of the pot 44. A plurality of holes 48 in the separator walls 40 facilitate passage of water to a root system 49 of a plant 50 may be provided. The separator S1 can be made of porous material to pass water uniformly to the root system 49 or it can be nonporous in which case more of the holes 48 will be provided. The separator S1 can be made of a molded material such as clay, plastic, glass or of a pressed material such as fiberboard, sheet metal, and the like or it can be made of a resin impregnated paper mache or any other suitable material. The separator S1 msy be manufactured of a solid sheet material in which event the outer ends of the walls should extend, in each direction, around a portion of the periphery of the walls of the pot and the bottom portion of each of the walls should have a floor portion to prevent the roots from growing from one compartment to another.

Referring now the FIG. 5 and FIG. 6 the stem 51 of the plant extends upwardly above soil 53 in the pot. The separators fit snugly in the pot and is removable to facilitate removing the plant from the pot 44. After removal of the separator S1 a cluster or clump 52 of the plant root system 49 may be spread outwardly as shown in FIG. 6. The clusters 52 radiate outwardly around the stem 51. This increases the area of the root system exposed to soil moisture after transplanting as much as 100 or 200 percent as compared with the area of a root ball 55 indicated by dotted line in FIG. 6.

FIG. 7 shows the same root separator S1 disposed in a rectangular, pyramidal pot or box 60. It will be noted that the separator S1 fits snugly against the flat slanted walls 62 of the pot or box 60 because the outer sides 43 of the separator S1 slant radially inwardly.

Figure 30:
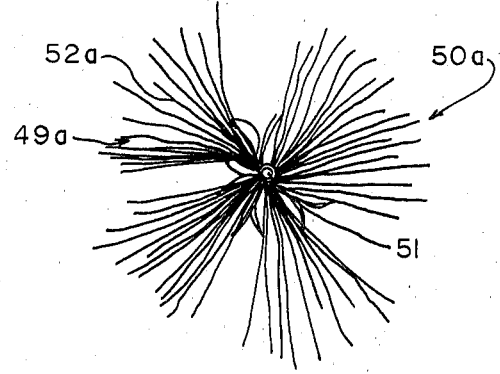
FIG. 30 is a horizontal sectional view similar to FIG. 6 taken through a plant stem after removal of the plant from a pot for transplanting showing four separated and spread out clumps of roots.

A second form of hollow separator S2 for a plant root system is shown in FIGS. 8 and 9. The separator S2 has four walls 40a which are concave, like the walls 40 of the separator S1 and four end walls 43a which slant inwardly. The top wall 42a is cross-like in plan view. The holes 48 in the walls 40a admit water to the root system of a plant in the rectangular pot 60a. Four compartments C1'–C4' are defined between the walls 40a and the slanted walls 622 of the container 60a. A plant 50a such as illustrated in FIG. 30, grown in container 60a will have four clumps or clusters 52a of roots in its root system 49a.

Figure 28:
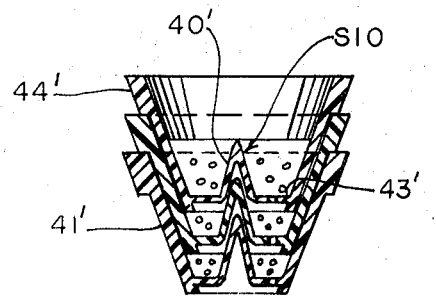
FIG. 28 is a cross sectional view taken along line 28—28 of FIG. 26 showing a stack of pots with integral root separators.

In FIGS. 10 and 11 there is shown a third form of root separator S3 having three solid fluted or corrugated walls 40b to provide three compartments C''. End walls 43b slant inwardly to conform with slanted walls or sides 41b of a plant container or pot 44b and fit into circumferentially spaced grooves 66 formed in the sides of the container 44b. The walls 40b of the separator are solid as compared with the walls 40 of the separator S1 which are hollow. By employing solid walls there is realized an economy in use of materials which is desirable and possible for small plants. For larger plants where aeration of soil is desirable or necessary the hollow wall structure of separators S1 and S2 may be used. The hollow wall structure also has the advantage of permitting nesting of the separators in one another, as shown in FIG. 28 and as will be more fully described further below. Nesting of the separators saves space in storage and shipment which is desirable. If desired more than three corrugated walls may be provided in the separator to provide more compartments C''.

A root separator S4 shown in FIGS. 12 and 13 has three solid flat radial walls 40c spaced about 120° apart and dividing a container 44c into three compartments C1''–C3'' like the separators S1 and S3. The separator S4 is simpler in construction than the separtors S1, S2 or S3 in that the ends 43' of the walls are slanted and engage in circumferentially spaced grooves 66 in wall 41c of the container 44c.

A root separator S5 in FIG. 14 is similar to the separator S4 but is adapted for use in a larger plant container 44d. Here three additional radially shorter walls 40d' are interposed respectively between radial walls 40d. The walls 40d extend up to the side wall 41d of the container 44d in which the circumferentially spaced grooves 66d receive ends 43d of the walls 40d. The walls 40d' are short partitions extending radially to the perimeter of round bottom 68 of the container 44d. This construction is desirable since it makes it easier to spread out the clusters of roots after the plant is removed from the container 44d.

A separator S6, shown in FIGS. 15 and 16, is a hollow shell-like structure with a pair of concave apertured walls 40e dividing the rectangular container 60b into two compartments C1a, C1b. This construction is desirable where only two root clusters will be sufficient for the plant grown in the container 60b.

A separator S7 shown in FIGS. 17–20 is a generally rectangular frame structure intended for insertion into a rectangular box 60c. The separator 57 has two spaced parallel vertical side walls 70 joined by two transverse parallel walls 72. Slanted ends 74 of the walls 70 fit into grooves 76 formed in end walls 78 of the box 60c (see FIG. 17). The separator S7 defines a multiplicity of compartments 80 with sides of the box. A central compartment 82 is defined by the walls 70, 72. This separator (S7) divides the root system of a plant into a plurality of sections which can readily be spread apart for transplanting.

Separator S8 shown in FIGS. 21–23 has a central cylindrical annular wall 84 formed with radially extending partitions 86 having slanted ends 88. The root separator S8 is intended for insertion into a large tub 90 having grooves 91 formed in its sides 89 into which the ends 88 of the partitions 86 are slidably engaged. A central circular raised platform 92 is formed at the bottom 93 of the tub 90. The annular wall 84 surrounding this platform is clearly shown in FIGS. 22 and 23. Separator S8 divides the lower part of the tub into a multiplicity of compartments 94 into which clusters of roots can grow. These clusters can easily be spread out when a plant grown in the tub is transplanted.

Figure 25:
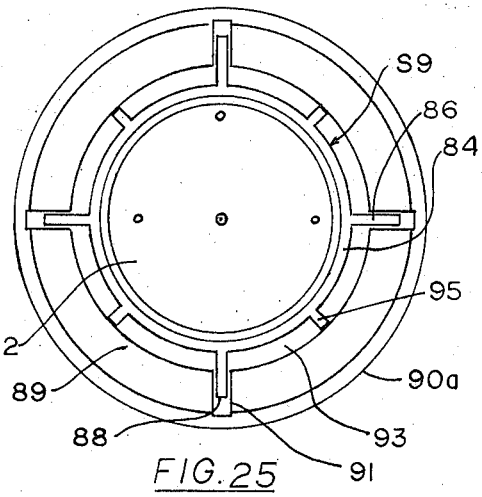
FIG. 25 is a top plan view of the ninth root separator in a large round pot.

A root separator S9 shown in FIGS. 24 and 25 is similar to the separator S8 but is intended for a still larger container or tub 90a where more root dividing compartments are desired. The separator S9 has a plurality of short partitions 95 extending radially of the annular wall 84 and disposed between the radially longer walls 86. The partitions 95 extend from the wall 84 outwardly to the perimeter of the circular bottom 93a of the tub 90a.

Figure 26:
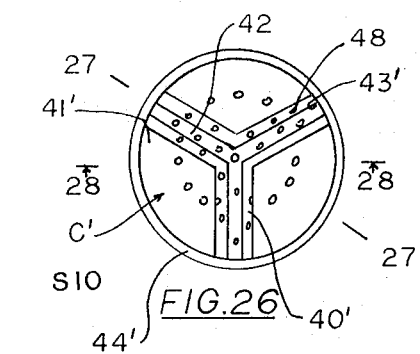
FIG. 26 is a top plan view of a pot with integrally molded in tenth root separator.
Figure 27:
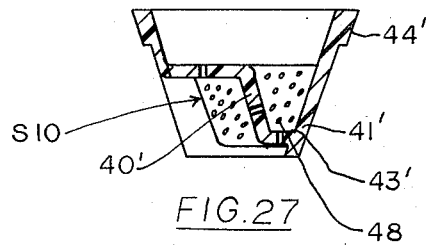
FIG. 27 is a vertical sectional view taken along line 27—27 of FIG. 26.

All the root separators S1 – S9 heretofore described are individual inserts which may be removably inserted into a plant container. It will be apparent that each of these root separators may be integrally formed with the sides of the plant container by molding or other assembly method. For example, FIGS. 26–28 show a root separator S10 which is similar to the root separator S1, in defining three compartments C', except that an end 43' of a hollow wall 40' is integral with a conical side wall 41' of a plant container 44'. The integral assembly of the root separator and the plant container may thus be fabricated by mass production molding machinery at very low cost and this structure has the advantage that a plurality of plant containers may be nested one within the other as shown in FIG. 28. The root separators S10 will fit inside one another and therefore effects a considerable savings in space during storage and shipment. In addition, the structure is more rigid and the separator remains permanently in place. It should be noted that the usual circular bottoms of the containers are omitted in order to have the bottoms open and thus permit nesting of the containers.

Figure 29:
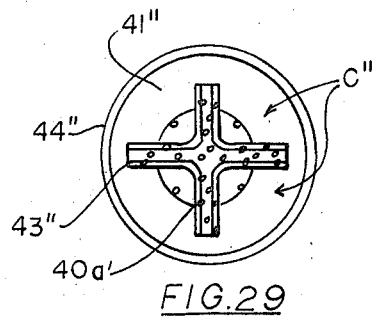
FIG. 29 is a top plan view of another pot with an integrally molded eleventh root separator.

In FIG. 29 a root separator S11 is similar to the root separator S2, except that each of an end 43'' of a hollow wall 40a' is integral with a side wall 41'' of a conical container 44''. Four compartments C'' are defined by the four walls 40a' of the root separator S11 which terminate at the wall 41''. This hollow structure also permits nesting of the containers and root separators in a manner similar to that illustrated in FIG. 28.

FIG. 30 shows how a plant 50a grown in the containers shown in FIGS. 8 and 29 will have four clumps or clusters of roots 52a in their root system 49a, since the root separators define four compartments in each container. Plants grown in the containers of FIGS. 3, 7, 11, 12 and 26 will have three root clusters as shown in FIG. 6. Plants grown in containers of FIGS. 14, 17, 22 and 25 will have five or more root clusters. Plants grown in containers having a single transverse dividing wall as shown in FIG. 15 will have two root clusters. It will thus be apparent that a plant container can be provided with a root separator to produce any desired number of separable and spreadable root clusters as may be required.

The several containers and root separators may be mass produced for utmost economy. They may be made to nest in each other to save storage and shipment space. They may be made of a lightweight material such as plastic or of a more massive material such as ceramic, glass, metal and the like. All the root separators operate in the same basic way to result in improved plant health, growth and stability after transplanting. Plants initially grown in containers having root separators as described will resist root girdling and will grow more sturdily then plants grown in conventional containers without root separators.

It should be understood that the foregoing relates to only a limited number of preferred embodiments of the invention, which have been by way of example only and that it is intended to cover all changes and modifications of the examples of the invention herein chosen for the purposes of the disclosure, which do not constitute departures from the spirit and scope of the invention.

The invention claimed is:

1. In a plant growing apparatus of the type wherein a plant having a root system is grown for a period of time in a plant container having a peripheral wall and a bottom, and then said plant is removed from said container for transplanting, the improvement comprising
a root separator having walls which are continuous and extend from a point on said peripheral wall to at least a second point on said peripheral wall wherein said second point is substantially separated from said first point by at walls one-quarter the circumference of the peripheral wall first said wall extending upwardly from said bottom to at least one quarter and no more than one-half the height of said container said walls having a top surface substantially parallel to said bottom, said walls defining a plurality of compartments into which said root system of said plant can grow to form a plurality of root clusters corresponding to said plurality of compartments whereby said root clusters can be spread apart after said plant is removed from said container for transplanting and wherein said plurality of root clusters provide stability to said plant for transplanting.

2. Apparatus as defined in claim 1 wherein said root separator is a hollow structure.

3. Apparatus as defined in claim 1 wherein each of said walls of said root separator has an outer end integral with said peripheral wall.

4. Apparatus as defined in claim 2, wherein said peripheral wall is tapered to permit a plurality of similar containers with integral root separators to nest within one another.

5. Apparatus as defined in claim 1, wherein said root separator is generally Y-shaped in plan view to define three compartments in said container.

6. Apparatus for growing a plant with a root system in a container having a peripheral wall and a bottom comprising,
a root separator for disposition inside said plant container, said root separator having at least one continuous wall extending from a first point on said peripheral wall and terminating at a second point on said peripheral wall wherein said second point is substantially separated from said first point by at least one-quarter the circumference of the peripheral wall, said wall extending from said bottom to at least one quarter and no more than one-half the height of said plant container, said wall having a top surface substantially parallel to said bottom said walls defining a plurality of compartments in which said root system of said plant can grow to form a plurality of root clusters, corresponding to said plurality of compartments whereby said root clusters can be spread apart after said plant is removed from said container for transplanting and wherein said plurality of root clusters provide stability to said plant for transplanting.

7. Apparatus as defined in claim 6 wherein said root separator is generally Y-shaped in plan view to define three compartments in said container.

* * * * *

UNITED STATES PATENT AND TRADEMARK OFFICE
CERTIFICATE OF CORRECTION

PATENT NO. : 3,830,015

DATED : August 20, 1974

INVENTOR(S) : Carlo Belgiorno

It is certified that error appears in the above-identified patent and that said Letters Patent are hereby corrected as shown below:

Column 6, Line 30, before "point" insert-- first --. Column 6 Line 33, change "walls" to--least--. Column 6, Line 34, change "first said wall" to--said walls--.

Signed and Sealed this

Twelfth Day of June 1979

[SEAL]

Attest:

RUTH C. MASON
Attesting Officer

DONALD W. BANNER
Commissioner of Patents and Trademarks